United States Patent
Mastrolia (10) Patent No.: US 11,427,338 B2
(45) Date of Patent: Aug. 30, 2022

(54) INCLINING CURVED EJECTION SEAT ASSEMBLIES

(71) Applicant: AMI Industries, Inc., Colorado Springs, CO (US)

(72) Inventor: Bradley Mastrolia, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 506 days.

(21) Appl. No.: 16/193,162

(22) Filed: Nov. 16, 2018

(65) Prior Publication Data

US 2020/0156798 A1    May 21, 2020

(51) Int. Cl.
*B64D 25/10* (2006.01)
*B64D 11/06* (2006.01)

(52) U.S. Cl.
CPC .......... *B64D 25/10* (2013.01); *B64D 11/0616* (2014.12); *B64D 11/064* (2014.12); *B64D 11/0689* (2013.01)

(58) Field of Classification Search
CPC .............................. B64D 11/0616; B64D 25/10
See application file for complete search history.

(56) References Cited

U.S. PATENT DOCUMENTS

| | | | |
|---|---|---|---|
| 2,467,763 A | 4/1949 | Martin | |
| 2,693,326 A | 11/1954 | Lobelle | |
| 2,726,831 A | 12/1955 | Bleck et al. | |
| 3,981,465 A | 9/1976 | Sinnett et al. | |
| 4,004,763 A | 1/1977 | Bunnell, III et al. | |
| 4,218,035 A | 8/1980 | Jordan | |
| 4,531,795 A | 7/1985 | Sinclair | |
| 4,613,101 A | 9/1986 | Herndon | |
| 4,667,901 A | 5/1987 | Erndon | |
| 5,067,671 A | 11/1991 | McIntyre et al. | |
| 5,152,479 A | 10/1992 | Ash et al. | |

FOREIGN PATENT DOCUMENTS

| | | |
|---|---|---|
| CN | 101954973 | 1/2011 |
| CN | 202314999 | 7/2012 |
| CN | 105620763 | 6/2016 |
| EP | 0454987 | 11/1991 |
| GB | 590253 | 7/1947 |
| WO | 9112989 | 9/1991 |

OTHER PUBLICATIONS

European Patent Office, European Search Report dated Apr. 29, 2020 in Application No. 19208920.9.

*Primary Examiner* — Jessica B Wong (74) *Attorney, Agent, or Firm* — Snell & Wilmer L.L.P.

(57) ABSTRACT

An inclining aircraft ejection seat assembly includes a curved ejection rail and an ejection seat having a guide disposed on a side of the ejection seat configured to travel along an arcuate path in mating alignment with the curved ejection rail and change a configuration of the ejection seat from a reclining position to an inclining position prior to ejection.

18 Claims, 7 Drawing Sheets

INCLINING CURVED EJECTION SEAT ASSEMBLIES

FIELD

In general, this disclosure relates to aircraft escape components, such as aircraft ejection seat assemblies.

BACKGROUND

Aircraft are often equipped with systems to effectuate escape of a crewmember (e.g., a pilot, a navigator, and/or other crewmember) in the event of a forced abandonment of the aircraft while in the air. A common escape system comprises an ejection seat, in which, upon activation, the ejection seat and the crewmember are ejected through an opening in an aircraft canopy, and away from the aircraft.

In many aircraft, the aircraft canopy comprises a glass enclosure, through which the crewmember, when seated in a cockpit, can visual observe the environment outside the aircraft. In such aircraft, the crewmember is often seated upright (and/or mostly upright), and the opening, opened via the aircraft canopy, is sufficiently large to permit passage therethrough of the ejection seat and its occupants (e.g., the crewmembers) in the event of an evacuation.

In modern aircraft, and with the advent of improved video displays, the glass enclosure may be eliminated. As the canopy thus eliminates transparencies, it further allows the crewmember(s) to maintain a more reclined position within the aircraft. The more reclined position increases the crewmember's comfort during flight, and it enables the crewmember to pilot the aircraft using primarily, and/or exclusively, instrument and/or camera/video guided control. However, highly reclined seats can be hazardous and/or impractical when ejecting crewmembers from supine and/or semi-supine positions.

SUMMARY

In various embodiments, an inclining aircraft ejection seat assembly includes at least the following: a curved ejection rail; and an ejection seat having a guide disposed on a side of the ejection seat configured to travel along an arcuate path in mating alignment with the curved ejection rail and change a configuration of the ejection seat from a reclining position to an inclining position prior to ejection.

In various embodiments: the guide comprises a roller; and/or the reclining position comprises a zero-gravity position; and/or at least one of a first seat angle of the inclining position is between approximately 70-90° in reference to a horizontal reference plane and a second seat angle of the reclining position is between approximately 10-70° in reference to the horizontal reference plane; and/or the curved ejection rail is curved at a constant radius throughout its length; and/or the curved ejection rail is a multi-curved curvilinear ejection rail having a first section formed at a first radius and a second section formed at a second radius that is different than the first radius; and/or the first radius is less than the second radius at an ejection end of the curved ejection rail; and/or the ejection seat further comprises multiple guides disposed on the side of the ejection seat; and/or the multiple guides are configured to travel along the arcuate path; and/or an intermediate guide of the multiple guides extends past a back surface of the ejection seat; and/or a first guide is nearer a top surface of the side, a second guide is intermediate the first guide and a third guide, and a first distance between the first guide and the second guide exceeds a second distance between the second guide and the third guide.

In various embodiments, an inclining aircraft ejection seat assembly includes at least the following: an ejection rail having a curved section and a linear section; and an ejection seat having a guide disposed on a side of the ejection seat configured to travel along at least the linear section of the ejection rail and change a configuration of the ejection seat from a reclining position to an inclining position prior to ejection.

In various embodiments: the guide comprises a roller; and/or the reclining position comprises a zero-gravity position; and/or at least one of a first seat angle of the inclining position is between approximately 70-90° in reference to a horizontal reference plane and a second seat angle of the reclining position is between approximately 10-70° in reference to the horizontal reference plane; and/or the ejection seat further comprises multiple guides disposed on the side of the ejection seat.

In various embodiments, a method of inclining an aircraft ejection seat prior to a launch sequence includes at least the following: reclining the aircraft ejection seat in a reclining position along an ejection rail; and inclining the aircraft ejection seat into an inclining position along the ejection rail prior to launching the aircraft ejection seat; wherein the ejection rail is at least one of curved and comprised of a curved section and a linear section.

In various embodiments: a seat angle of the reclining position is between approximately 10-70° in reference to a horizontal reference plane; and/or a seat angle of the inclining position is between approximately 70-90° in reference to a horizontal reference plane; and/or at least one of a first seat angle of the inclining position is between approximately 70-90° in reference to a horizontal reference plane and a second seat angle of the reclining position is between approximately 10-70° in reference to the horizontal reference plane.

BRIEF DESCRIPTION OF THE DRAWINGS

The accompanying drawings illustrate various embodiments employing the principles described herein and are a part of this specification. The illustrated embodiments are meant for description only, and they do not limit the scope of the claims, and in which:

DETAILED DESCRIPTION

This detailed description of exemplary embodiments references the accompanying drawings, which show exemplary embodiments by way of illustration. While these exemplary embodiments are described in sufficient detail to enable those skilled in the art to practice this disclosure, it should be understood that other embodiments may be realized and that logical changes and adaptations in construction and design may be made in accordance with this disclosure and the teachings described herein without departing from the scope and spirit of this disclosure. Thus, this detailed description is presented for purposes of illustration only and not of limitation.

In accordance with various aspects of this disclosure, systems and methods are described for ejecting a crewmember and/or an ejection seat from an aircraft along ejection rails that are curved and/or have a curved section.

Figure 1A:
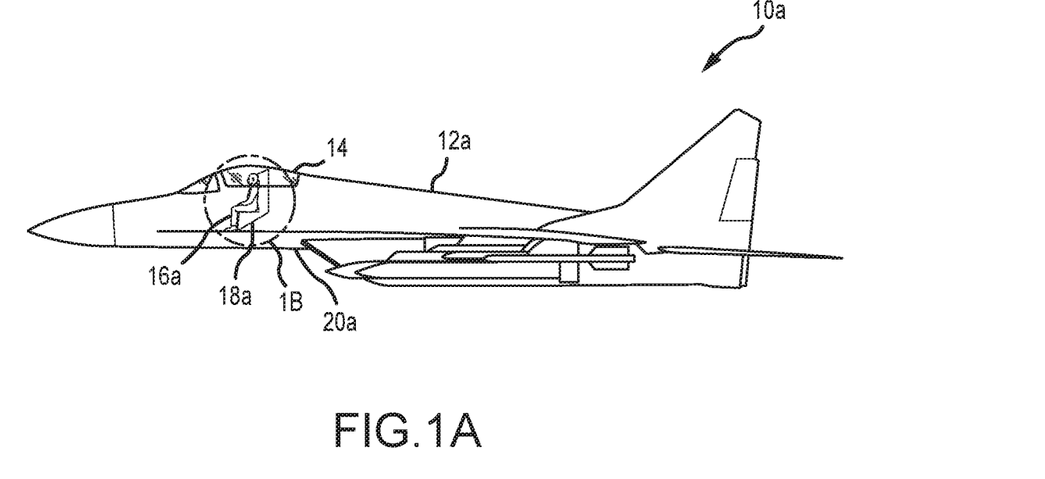
FIG. 1A is a simplified side view of an aircraft with a windowed canopy, in accordance with various embodiments.

Referring now to FIG. 1A, an aircraft 10 (e.g., aircraft 10a) comprises a fuselage 12 (e.g., fuselage 12a) having a windowed canopy 14 enclosing an internal cockpit in which a crewmember 16 (e.g., crewmember 16a) sits while flying the aircraft 10a. When seated within the cockpit, the crewmember 16a sits on a seat comprising an ejection seat 18 (e.g., ejection seat 18a), with the crewmember 16a positioned within the cockpit so as to be able to look out the windowed canopy 14 when seated on the ejection seat 18a within the aircraft 10.

Figure 1B:
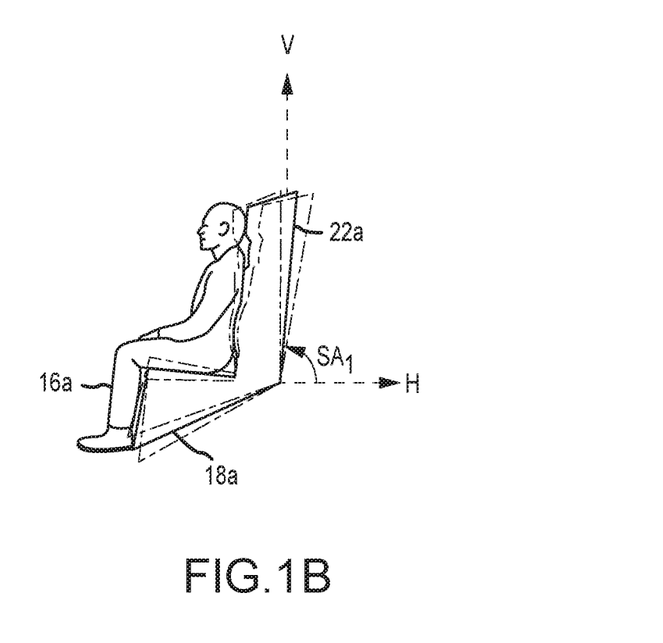
FIG. 1B is an exploded side view of a crewmember and an upright ejection seat of the aircraft of FIG. 1A, in accordance with various embodiments.

Referring now also to FIG. 1B, the crewmember 16a, when seated on the ejection seat 18a, can, in various embodiments, tilt back (i.e., aft) by a predetermined amount within the cockpit. For example, defining a horizontal reference plane H as being parallel, or substantially parallel, to a bottom surface 20 (e.g., bottom surface 20a) of the fuselage 12a and/or a ground surface when the aircraft 10a is at rest on the ground and/or a level surface such as a flight deck, a back surface 22 (e.g., back surface 22a) of the ejection seat 18a distal the crewmember 16a forms a seat angle (SA), such as a first seat angle ($SA_1$), with the horizontal reference plane H. In various embodiments, the first $SA_1$ may be 90°, such as when the ejection seat 18a is orthogonal to the horizontal reference plane H. In various embodiments, the first $SA_1$ may be between approximately 70-90°, with approximately meaning, in this case only, plus or minus 5°. When the first $SA_1$ is approximately 70-90°, the crewmember 16a and/or the ejection seat 18a can be ejected from the aircraft 10a through an opening created within the fuselage 12, in various embodiments. In various contexts, SAs can also be referenced from a vertical reference plane V that is orthogonal to the horizontal reference plane H.

Figure 2A:
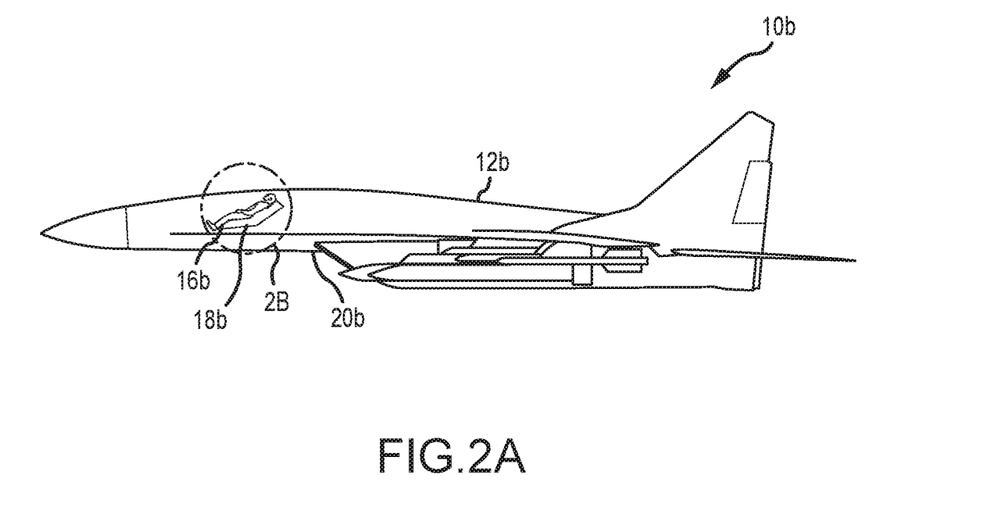
FIG. 2A is a simplified side view of an aircraft without a windowed canopy, in accordance with various embodiments.

Referring now also to FIG. 2A, the aircraft 10 (e.g., aircraft 10b) comprises the fuselage 12 (e.g., fuselage 12b) without the windowed canopy 14 of the aircraft 10a of FIG. 1A enclosing the internal cockpit in which the crewmember 16 (e.g., crewmember 16b) sits while flying the aircraft 10b. When seated within the cockpit, the crewmember 16b sits on the seat comprising the ejection seat 18 (e.g., ejection seat 18b), with the crewmember 16b positioned within the cockpit in a reclined position when seated on the ejection seat 18b. In various embodiments, the reclined position is a zero-gravity (zero-g) position. The zero-g position, and/or other positions, distributes stresses on the crewmember 16b during flight in a safer and/or more comfortable way than when flying in the more upright ejection seat 18a of the aircraft 10a of FIGS. 1A-1B. In addition, the supine and/or semi-supine attitude of the crewmember 16b yields, in various embodiments, an increase in human tolerance to sustained accelerations of the aircraft 10b, referred to as high-gravity (high-g) capabilities. In any event, from within the aircraft 10b of FIG. 2A, the crewmember 16b flies and/or controls the aircraft 10b, including without the benefit of the windowed canopy 14 of FIG. 1A (and/or a reduced windowed canopy 14), such as by using aircraft instrumentation and/or video capture screens to assess the environment outside the aircraft 10b.

Figure 2B:
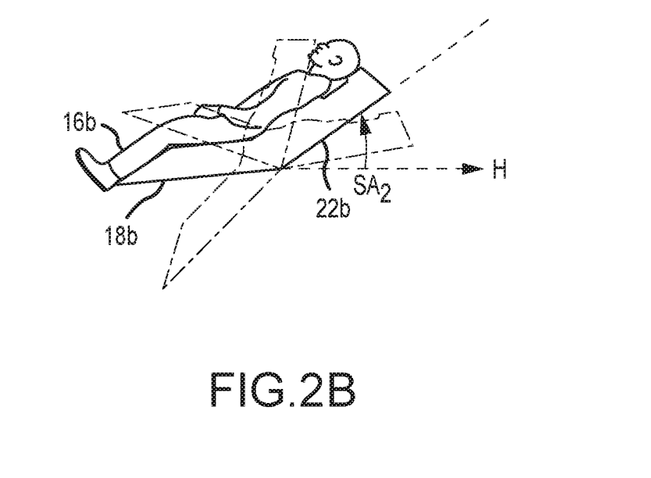
FIG. 2B is an exploded side view of a crewmember and a reclining and inclining ejection seat of the aircraft of FIG. 2A, in accordance with various embodiments.

Referring now also to FIG. 2B, the crewmember 16b is seated on the ejection seat 18b, which can, in various embodiments, tilt back (i.e., aft) by a predetermined amount within the cockpit. For example, defining the horizontal reference plane H as being parallel, or substantially parallel, to the bottom surface 20 (e.g., bottom surface 20b) of the fuselage 12b and/or the ground surface when the aircraft 10b is at rest on the ground and/or a level surface such as a flight deck, the back surface 22 (e.g., back surface 22b) of the ejection seat 18b distal the crewmember 16b forms a seat angle (SA), such as a second seat angle ($SA_2$), with the horizontal reference plane H. In various embodiments, the second $SA_2$ may be 20°, such as when the ejection seat 18b is reclined within the cockpit. In various embodiments, the second $SA_2$ may be between approximately 10-70°, with approximately meaning, in this case only, plus or minus 5°. When the second $SA_2$ is approximately 10-70°, the crewmember 16b and/or the ejection seat 18b are not, in various embodiments, configured to be ejected from the aircraft 10b through an opening created within the fuselage 12b. For example, when the second $SA_2$ is less than approximately 70°, ejecting the crewmember 16b and/or the ejection seat 18b from the aircraft 10b through an opening created within the fuselage 12b can be hazardous and/or impractical (e.g., requiring a large ejection path), particularly when ejecting the crewmember 16b from a supine and/or semi-supine position. Accordingly, the crewmember 16b and the ejection seat 18b are brought to an inclined seat position (e.g., as defined by the first $SA_1$) prior to being ejected from the aircraft 10b, in various embodiments.

Figure 3:
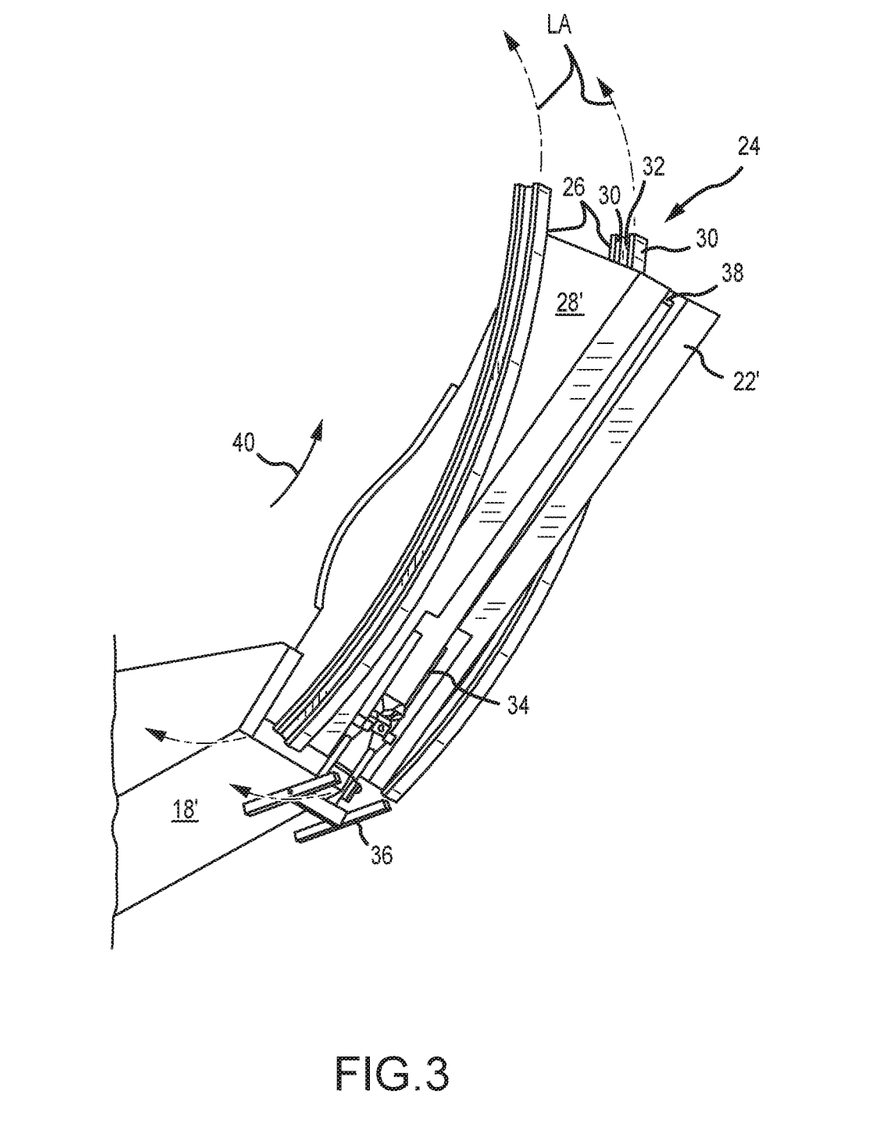
FIG. 3 is a simplified perspective view of a catapult, an ejection seat, and a pair of curved ejection rails, in accordance with various embodiments.

Referring now also to FIG. 3, a first ejection seat 18' rides on a rail system 24 comprising a pair of curved ejection rails 26, one curved ejection rail 26 disposed on each of opposing sides 28 (e.g., side 28') of the ejection seat 18', in various embodiments. In various embodiments, the rail system 24 comprises a single curved ejection rail 26 disposed along the back surface 22' of the ejection seat 18'. In various embodiments, the curved ejection rails 26 are external to outer surfaces of the ejection seat 18' and fixedly anchored and/or attached to the aircraft 10, such as to the fuselage 12 and/or other surface. In various embodiments, the curved ejection rails 26 are C-shaped or I-shaped in cross-section, with inwardly-extending inner flanges 30 disposed on opposing sides of an inner channel 32, the inner flanges 30 disposed in a direction towards the sides 28' of the ejection seat 18' and/or towards the crewmember 16 when the crewmember 16 is seated in the ejection seat 18'.

Still referring to FIG. 3, a catapult 34, comprising, in various embodiments, a gas-activated piston within an outer cylindrical casing, is configured to launch the crewmember 16 and the ejection seat 18' from the aircraft 10 in response to activation of a launch sequence. In various embodiments, the catapult 34 comprises a lower pivot 36 disposed towards a bottom of the ejection seat 18' (i.e., towards a floor surface of the aircraft 10 when the aircraft 10 is at rest on the ground and/or a level surface such as a flight deck) and an upper pivot 38 disposed towards a top of the ejection seat 18' (i.e., towards a head of the crewmember 16 when the crewmember 16 is seated in the ejection seat 18'). The lower pivot 36 and the upper pivot 38 allow the ejection seat 18' to rotate into a launch position as the ejection seat 18' travels along the curved ejection rails 26 in the direction of the arrow 40 in the figure and into an exit configuration.

Still referring to FIG. 3, the curved ejection rails 26 are, in various embodiments, parallel to one another on opposing sides 28' of the ejection seat 18', enabling exit of the crewmember 16 and the ejection seat 18' from the aircraft 10 during the launching sequence. In the arrangement of FIG. 3, the curved ejection rails 26 are curved about their length (i.e., about longitudinal axes (LA) of the curved ejection rails 26) and in a fore position, as elaborated upon herein.

However, ejecting the crewmember 16 and/or the ejection seat 18' from a reclined position (e.g., from the second $SA_2$ of approximately 10-70°, 15-65°, or 20-60°, with approximately meaning, in this case only, plus or minus 5°) can be impractical and/or dangerous, in various embodiments. Accordingly, the ejection seat 18' is repositioned during the ejection sequence. More specifically, for ejection, the crewmember 16 and/or the ejection seat 18' are rotated and repositioned during the ejection sequence from the reclined positioning(s) shown in FIGS. 2A-2B to the more inclined and upright seat positioning(s) shown in FIGS. 1A-1B— e.g., from the second $SA_2$ of approximately 10-70°, 15-65°, or 20-60° to the first $SA_1$ of approximately 70-90°, 75-85°, or 80°, with approximately meaning, in these cases only, plus or minus 5°.

Figures 4, 5:
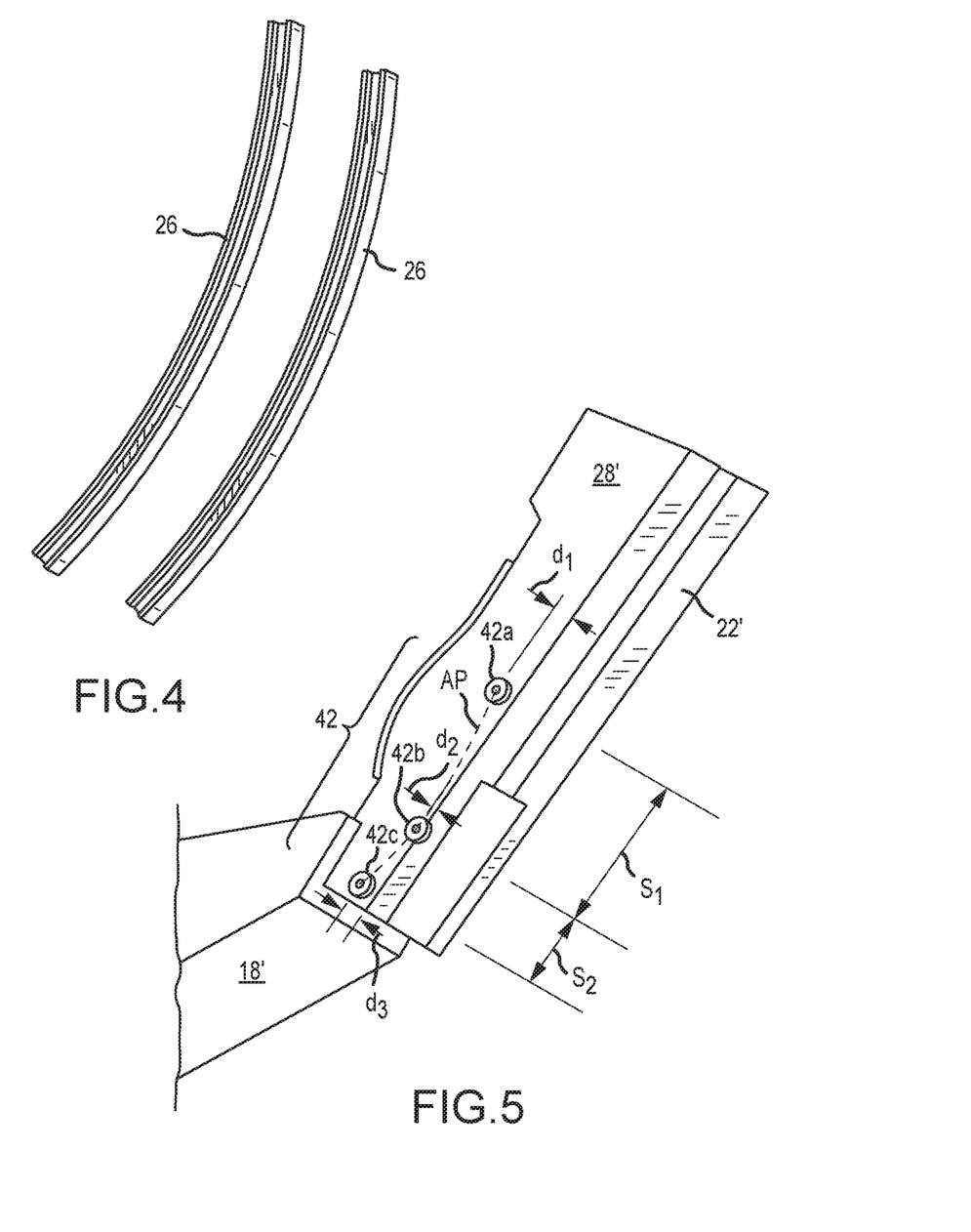
FIG. 4 is a simplified perspective view of the catapult and the pair of curved ejection rails of FIG. 3, configured for use with the ejection seat of FIG. 5, in accordance with various embodiments.
FIG. 5 is a simplified perspective view of the ejection seat of FIG. 3, configured for use with the catapult and the pair of curved ejection rails of FIG. 4, in accordance with various embodiments.

Referring now also to FIG. 4, the pair of curved ejection rails 26 of FIG. 3 is shown, the curved ejection rails 26 being fixedly attached to the aircraft 10, in various embodiments. The curved ejection rails 26 allow the crewmember 16 and/or the ejection seat 18' to move from the reclined position to the inclined position for ejecting the crewmember 16 and/or the ejection seat 18' from the aircraft 10. In various embodiments, the reclined seat positions form the second $SA_2$ of approximately 10-70°, 15-65°, or 20-60°, with approximately meaning, in this case only, plus or minus 5°. In various embodiments, the inclined seat positions form the first $SA_1$ of approximately 70-90°, 75-85°, or 80°, with approximately meaning, in this case only, plus or minus 5°. In FIG. 4, each of the curved ejection rails 26 comprises a singular rail that allows the reclining crewmember 16 and the ejection seat 18' to incline and be ejected at a vertical, or nearly vertical, angle relative to the vertical reference plane V shown in FIG. 1B. Upon activation of the catapult 34, the ejection seat 18' translates slightly rearward (i.e., aft) and up (i.e., along arrow 40 shown in FIG. 3) within the cockpit of the aircraft 10 and is rotated from the reclined position to the inclined (e.g., more upright) position due to the curved ejection rails 26.

Upon activation of the ejection sequence, an opening is formed in the fuselage 12 of the aircraft 10 by various opening techniques. Substantially simultaneously, an explosive force within the catapult 34 is detonated, forcing the crewmember 16, affixed to the ejection seat 18', to follow a path defined by the curved ejection rails 26. At an installed angle of the catapult 34, horizontal and vertical load components of the explosive force within the cylinder of the catapult 34 translate and rotate the ejection seat 18' about the lower pivot 36 and the upper pivot 38 along the curved ejection rails 26 and into an inclined ejecting attitude, prior to expulsion from the aircraft 10.

Referring now also to FIG. 5, the ejection seat 18' further comprises at least one guide 42 on each side 28' of the ejection seat 18', wherein each guide 42 is sized and/or otherwise configured to move in direct communication with at least part of the curved ejection rails 26 that are affixed to and/or supported by the aircraft 10. For example, in various embodiments, each of the guides 42 travels within the inner flanges 30 and the inner channel 32 (labelled in FIG. 3) in the curved ejection rail 26 of FIGS. 3-4. In various embodiments, the ejection seat 18' includes an upper guide 42a disposed nearer a top surface (e.g., nearer a head of the crewmember 16 when the crewmember 16 is seated on the ejection seat 18') on the side 28' of the ejection seat 18', an intermediate guide 42b, and a lower guide 42c disposed nearer a bottom surface (e.g., distal a head of the crewmember 16 when the crewmember 16 is seated on the ejection seat 18') on the side 28' of the ejection seat 18', the intermediate guide 42b being disposed between the upper guide 42a and the lower guide 42c, with all three guides 42 being disposed alongside the side 28' of the ejection seat 18'. As the ejection seat 18' follows and travels up the curved ejection rails 26 of FIGS. 3-4, the upper guide 42a is a first to disengage from the curved ejection rails 26 (i.e., while the intermediate guide 42b and the lower guide 42c remain engaged), followed by the intermediate guide 42b (i.e., while the lower guide 42c remains engaged), followed by the lower guide 42c. In various embodiments, the guides 42 are the same size or substantially the same size (e.g., have a same or similar radii). In various embodiments, the intermediate guide 42b is smaller than the upper guide 42a and/or the lower guide 42c (e.g., has a smaller radius). In various embodiments, the guides 42 comprise at least one of balls, bearings, rollers, slides, wheels, etc., which are configured to travel along at least part of the curved ejection rails 26.

In various embodiments, the upper guide 42a, the intermediate guide 42b, and the lower guide 42c are not linearly aligned along the side 28' of the ejection seat 18'. In various embodiments, the upper guide 42a, the intermediate guide 42b, and the lower guide 42c define an arcuate path AP that aligns with the shape and curvature of the curved ejection rails 26 of FIGS. 3-4. For example, in various embodiments, the intermediate guide 42b is located closer to the back surface 22' of the ejection seat 18' along the side 28' of the ejection seat 18' to define the arcuate path AP. In various embodiments, the upper guide 42a and the lower guide 42c are equidistant from the back surface 22' of the ejection seat 18' alongside the side 28' of the ejection seat 18'. For example, in various embodiments, a center of the upper guide 42a is a first distance $d_1$ from the back surface 22' of the ejection seat 18', a center of the intermediate guide 42b is a second distance $d_2$ from the back surface 22' of the ejection seat 18', and a center of the lower guide 42c is a third distance $d_3$ from the back surface 22' of the ejection seat 18'. In various embodiments, the first distance $d_1$ is the same, or approximately the same, as the third distance $d_3$. In various embodiments, the first distance $d_1$>the second distance $d_2$, and/or the third distance $d_3$>the second distance $d_2$. In various embodiments, the center of the upper guide 42a, the center of the intermediate guide 42b, and the center of the lower guide 42c define and form the arcuate path AP that aligns with the shape and curvature of the curved ejection rails 26 of FIGS. 3-4. In various embodiments, the curved ejection rail 26 of FIGS. 3-4 is curved (e.g., concave) towards the crewmember 16 when the crewmember 16 is seated in the ejection seat 18', which follows a contour of the placement of the guides 42 alongside the side 28' of the ejection seat 18' for mating alignment therebetween.

In various embodiments, a first spacing distance $S_1$ along the side 28' of the ejection seat 18' between the upper guide 42a and the intermediate guide 42b exceeds a second spacing distance $S_2$ along the side 28' of the ejection seat 18' between the intermediate guide 42b and the lower guide 42c. In various embodiments, having the first spacing distance $S_1$ exceed the second spacing distance $S_2$ alongside the side of the ejection seat 18' tends to minimize and/or prevent the ejection seat 18' from tipping off (i.e., being induced into a roll) as it is discharged from the curved ejection rails 26 of FIGS. 3-4 of the aircraft 10.

In various embodiments, an outer edge of the intermediate guide 42b extends beyond a plane defined by and/or along the back surface 22' of the ejection seat 18'.

In various embodiments, the ejection seat 18' comprises more than three (e.g., four or five or six or more, although only three are shown for illustrative purposes) guides 42 on each side 28' of the ejection seat 18', provided each guide 42 follows along an extension of the arcuate path AP formed by the upper guide 42a, the intermediate guide 42b, and the lower guide 42c, as well as follows the contour and/or shape of the curved ejection rails 26 of FIGS. 3-4.

In various embodiments, the curved ejection rail 26 is curved at a constant radius throughout its length, as shown in FIG. 4.

Figure 6:
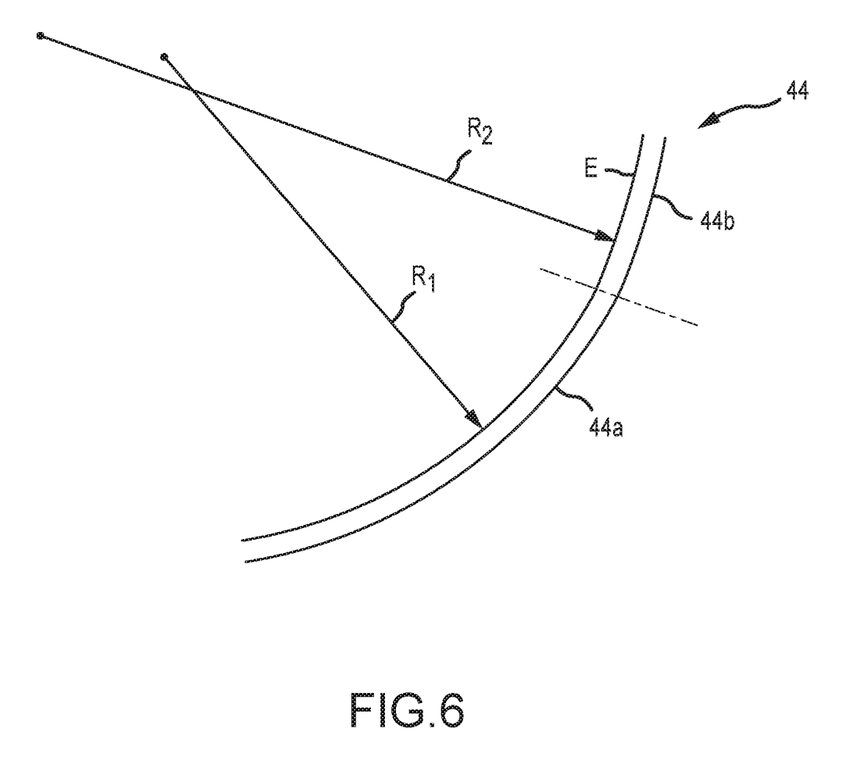
FIG. 6 is a simplified perspective view of a multi-curved curvilinear ejection rail configured for use with the ejection seat of FIG. 5, in accordance with various embodiments.

In various embodiments, and referring now also to FIG. 6, a multi-curved curvilinear ejection rail 44 comprises two or more sections of various radii, such as a first section 44a having a first radius $R_1$ and a second section 44b having a second radius $R_2$, the second section 44b being closer to an ejection end E of the multi-curved curvilinear ejection rail 44. In various embodiments, the first radius $R_1$ of the first section 44a is less than the second radius $R_2$ of the second section 44b, thereby allowing the crewmember 16 and the ejection seat 18' to reach a more vertical orientation more quickly during the second section 44b of the multi-curved curvilinear ejection rail 44.

Figures 7, 8:
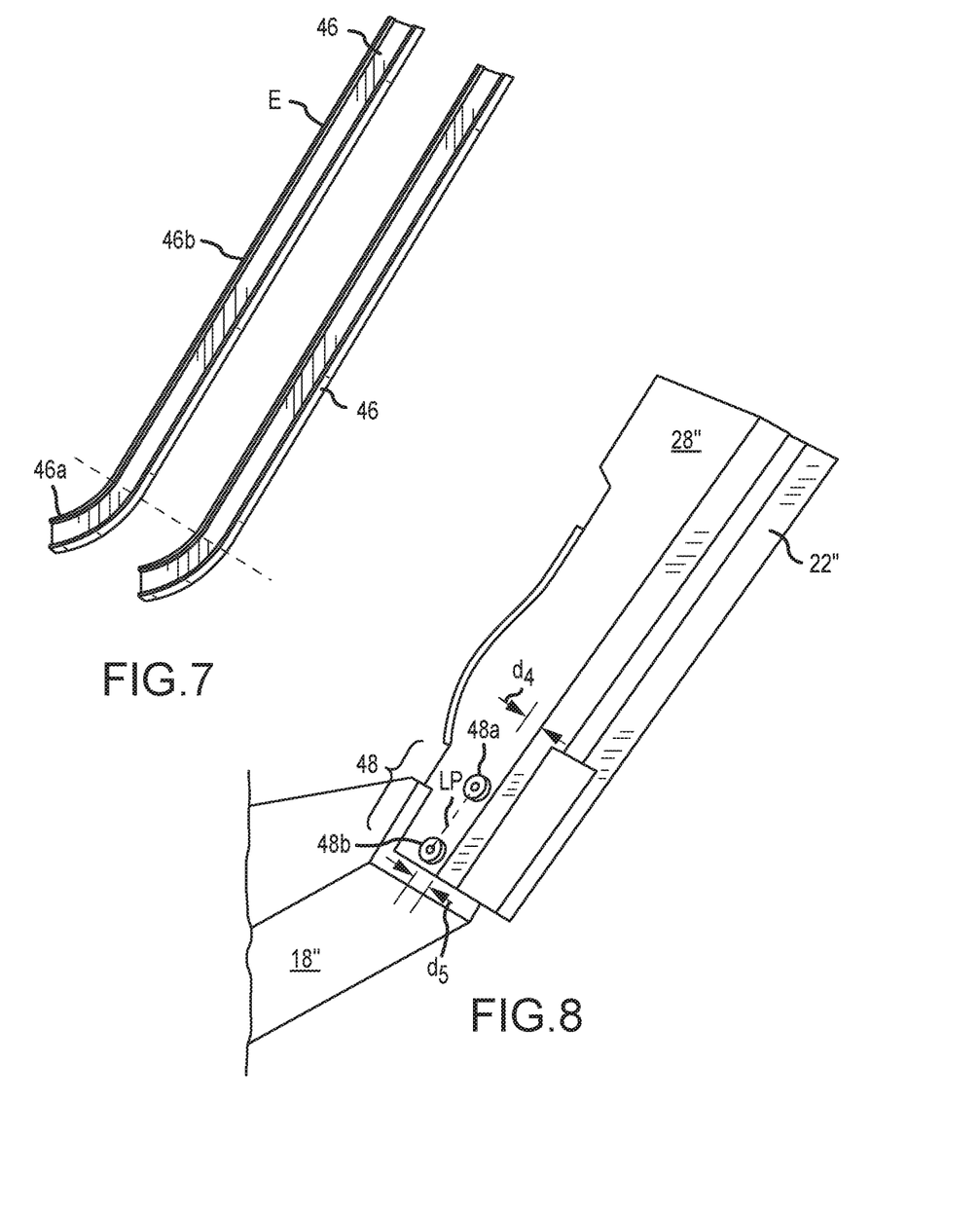
FIG. 7 is a simplified perspective view of the catapult and a pair of curved and linear ejection rails, configured for use with the ejection seat of FIG. 8, in accordance with various embodiments.
FIG. 8 is a simplified perspective view of an ejection seat, configured for use with the catapult and the pair of curved and linear ejection rails of FIG. 7, in accordance with various embodiments.

Referring now also to FIG. 7, a pair of curved and linear ejection rails 46 is shown, the curved and linear ejection rails 46 being fixedly attached to the aircraft 10, in various embodiments. The curved and linear ejection rails 46 allow the crewmember 16 and/or a second ejection seat 18" to move from the reclined position to the inclined position for ejecting the crewmember 16 and/or the ejection seat 18" from the aircraft 10. In various embodiments, the reclined seat positions form the second $SA_2$ of approximately 10-70°, 15-65°, or 20-60°, with approximately meaning, in this case only, plus or minus 5°. In various embodiments, the inclined seat positions form the first $SA_1$ of approximately 70-90°, 75-85°, or 80°, with approximately meaning, in this case only, plus or minus 5°. In FIG. 7, each of the curved and linear ejection rails 46 comprises a singular rail that allows the reclining crewmember 16 and the ejection seat 18" to incline and be ejected at a vertical, or nearly vertical, angle relative to the vertical reference plane V shown in FIG. 1B. Upon activation of the catapult 34, the ejection seat 18" translates slightly rearward (i.e., aft) and up within the cockpit of the aircraft 10 and is rotated from the reclined position to the inclined (e.g., more upright) position due to the curved and linear ejection rails 46.

Referring still to FIG. 7, the curved and linear ejection rails 46 comprise a curved section 46a and a linear (i.e., straight) section 46b, in various embodiments, with the linear section 46b disposed closer to the ejection end E of the curved and linear ejection rails 46. In various embodiments, the curved section 46a and the linear section 46b comprise the curved and linear ejection rail 46.

Referring now also to FIG. 8, the ejection seat 18" further comprises at least two guides 48 on each side 28 (e.g., side 28") of the ejection seat 18", wherein each guide 48 is sized and/or otherwise configured to move in direct communication with at least part of the curved and linear ejection rails 46 that are affixed to and/or supported by the aircraft 10. In various embodiments, the ejection seat 18" includes an upper guide 48a disposed nearer a top surface (e.g., nearer a head of the crewmember 16 when the crewmember 16 is seated on the ejection seat 18") on the side 28" of the ejection seat 18", and a lower guide 48b disposed nearer a bottom surface (e.g., distal a head of the crewmember 16 when the crewmember 16 is seated on the ejection seat 18") on the side 28" of the ejection seat 18", with both guides 48 being disposed alongside the side 28" of the ejection seat 18". As the ejection seat 18" follows and travels up the curved and linear ejection rails 46 of FIG. 7, the upper guide 48a is a first to disengage from the curved and linear ejection rails 46 (i.e., while the lower guide 48b remains engaged), followed by the lower guide 48b. In various embodiments, the guides 48 are the same size or substantially the same size (e.g., have a same or similar radii). In various embodiments, the guides 48 comprise at least one of balls, bearings, rollers, slides, wheels, etc., which are configured to travel along at least part of the linear section 46b of the curved and linear ejection rails 46.

In various embodiments, the guides 48 are linearly aligned along the side 28" of the ejection seat 18". In various embodiments, the upper guide 48a and the lower guide 48b are equidistant from the back surface 22" of the ejection seat 18" alongside the side 28" of the ejection seat 18". For example, in various embodiments, a center of the upper guide 48a is a fourth distance $d_4$ from the back surface 22" of the ejection seat 18", and a center of the lower guide 48b is a fifth distance $d_5$ from the back surface 22" of the ejection seat 18". In various embodiments, the fourth distance $d_4$ is the same, or approximately the same, as the fifth distance $d_5$. In various embodiments, the center of the upper guide 48a and the center of the lower guide 48b define and form a linear path LP that aligns with the shape and inclination of the linear section 46b of the curved and linear ejection rails 46 of FIG. 7.

In various embodiments, the ejection seat 18" comprises more than two (e.g., three or four or five or more, although only two are shown for illustrative purposes) guides 48 on each side 28" of the ejection seat 18", provided each guide 48 follows along an extension of the linear path LP formed by the upper guide 48a and the lower guide 48b, as well as follows the contour and/or inclination of the linear section 46b of the curved and linear ejection rails 46 of FIG. 7.

Figure 9:
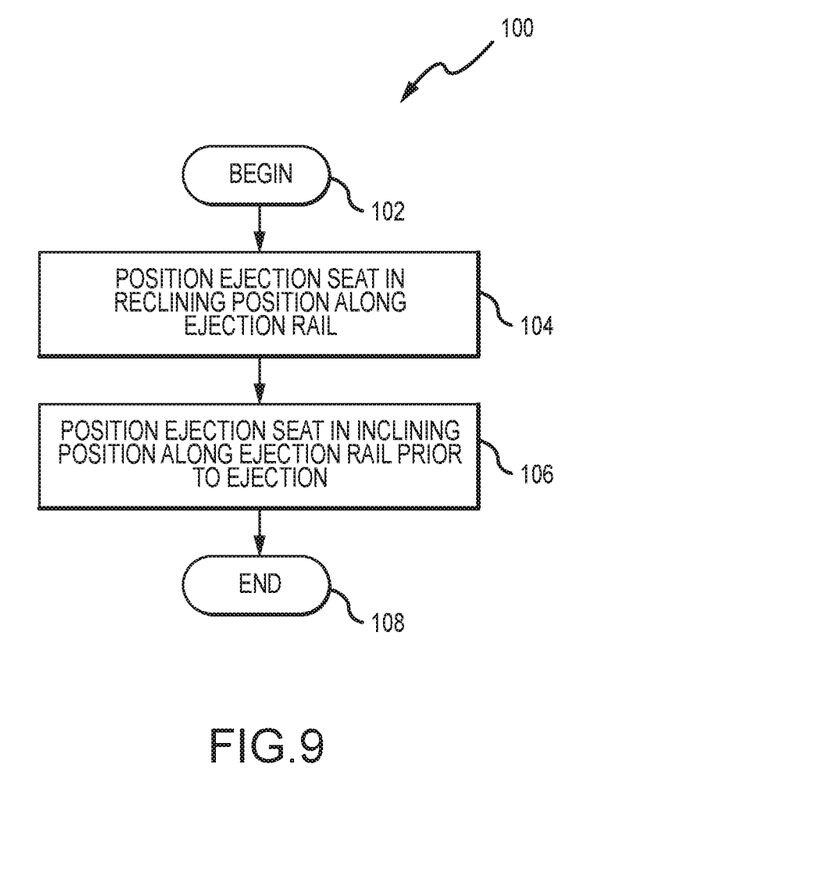
FIG. 9 is a simplified flowchart method of positioning an ejection seat in a reclining position and in an inclining position prior ejection, in according with the various embodiments of FIGS. 1-8.

Referring now to FIG. 9, a method 100 begins at a step 102. Thereafter, an ejection seat 18 is configured to be positioned in a reclining position, as defined herein, along a curved ejection rail 26, a multi-curved curvilinear ejection rail 44, and/or a curved and linear ejection rail 46 in a step 104. In addition, the ejection seat 18 is also configured to be positioned in an inclining position, as defined herein, along the curved ejection rail 26, the multi-curved curvilinear ejection rail 44, and/or the curved and linear ejection rail 46 prior to ejection in a step 106, after which the method 100 ends at a step 108.

Technical benefits and effects of this disclosure include providing an aircraft ejection seat 18 that is configured to be able to be reclined to a reclined position when in flight for operating at least a part of the aircraft 10, and also configured to be able to be inclined to an inclined position prior to ejecting the crewmember 16 and/or the ejection seat 18 from the aircraft 10, which enables a more effective ejection posture than would be feasible from the reclined position. The inclination is enabled, at least in part, by at least one of a curved ejection rail 26, a multi-curved curvilinear ejection rail 44, and/or a curved and linear ejection rail 46, each configured for use with guides 42, 48, such as rollers, configured for mating alignment with the curved ejection rail 26, the multi-curved curvilinear ejection rail 44, and/or the curved and linear ejection rail 46.

Advantages, benefits, and/or solutions to problems have been described herein with regard to specific embodiments. Furthermore, connecting lines shown in the various figures contained herein are intended to represent exemplary functional relationships and/or physical couplings between the various elements. It should be noted that many additional and/or functional relationships or physical connections may be present in a practical system. However, the advantages, benefits, and/or solutions to problems, and any elements that may cause any advantage, benefit, and/or solution to occur or become more pronounced are not to be construed as critical, essential, and/or required elements or features of this disclosure.

The scope of this disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one, and that reference to an item in the singular may also include the item in the plural, and vice-versa. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C. Different cross-hatching is used throughout the figures to denote different parts, but not necessarily to denote the same or different materials. Like depictions and/or numerals also generally represent like elements.

The steps recited in any of the method or process descriptions may be executed in any order and are not necessarily limited to the order presented. Furthermore, any reference to singular elements, embodiments, and/or steps includes plurals thereof, and any reference to more than one element, embodiment, and/or step may include a singular one thereof. Elements and steps in the figures are illustrated for simplicity and clarity and have not necessarily been rendered according to any particular sequence. For example, steps that may be performed concurrently or in different order are only illustrated in the figures to help to improve understanding of embodiments of the present, representative disclosure.

Any reference to attached, fixed, connected, or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas, but not necessarily to denote the same or different materials. In some cases, reference coordinates may or may not be specific to each figure.

Systems, methods, and apparatus are provided herein. In the detailed description herein, references to "one embodiment," "an embodiment," "various embodiments," etc., indicate that the embodiment described may include a particular characteristic, feature, and/or structure, but every embodiment may not necessarily include this particular characteristic, feature, and/or structure. Moreover, such phrases are not necessarily referring to the same embodiment. Further, when a particular characteristic, feature, and/or structure is described in connection with an embodiment, it is submitted that it is within the knowledge of one skilled in the art to affect such characteristic, feature, and/or structure in connection with other embodiments, whether or not explicitly described. After reading the description, it will be apparent to one skilled in the relevant art(s) how to implement this disclosure in alternative embodiments.

Furthermore, no component, element, or method step in the present disclosure is intended to be dedicated to the public regardless of whether the component, element, or method step is explicitly recited in the claims. No claim element is intended to invoke 35 U.S.C. § 112(f) unless the element is expressly recited using the phrase "means for." As used herein, the terms "comprises," "comprising," or any other variation thereof, are intended to cover a non-exclusive inclusion, such that an apparatus, article, method, and/or process, method that comprises a list of elements does not include only those elements, but it may also include other elements not expressly listed or inherent to such apparatus, article, method, and/or process.

What is claimed is:

1. An inclining aircraft ejection seat assembly, comprising:
    a catapult;
    a curved ejection rail defining a longitudinal axis, the curved ejection rail curved for an entirety of the longitudinal axis; and
    an ejection seat having a guide disposed on a side of the ejection seat and a seat back defining a seat back plane, the guide configured to travel along an arcuate path in mating alignment with the curved ejection rail and change a configuration of the ejection seat from a reclining position to an inclining position prior to ejection, wherein:
        a first ejection seat position including a first seat angle between a horizontal reference plane and the seat back plane for the reclining position is between approximately 10-45°,
        a second ejection seat position including a second seat angle between the horizontal reference plane and the seat back plane for the inclining position is greater than the first seat angle,
        the curved ejection rail is configured to reposition the ejection seat from the first ejection seat position to the second ejection seat position prior to ejection of the ejection seat where the guide becomes disengaged with the curved ejection rail, and the ejection seat configured to follow a path defined by the curved ejection rail in response to an explosive force within the catapult.

2. The inclining aircraft ejection seat assembly of claim 1, wherein the guide comprises a roller.

3. The inclining aircraft ejection seat assembly of claim 1, wherein the reclining position comprises a zero-gravity position.

4. The inclining aircraft ejection seat assembly of claim 1, wherein the curved ejection rail is curved at a constant radius throughout its length.

5. The inclining aircraft ejection seat assembly of claim 1, wherein the curved ejection rail is a multi-curved curvilinear ejection rail having a first section formed at a first radius and a second section formed at a second radius that is different than the first radius.

6. The inclining aircraft ejection seat assembly of claim 5, wherein the first radius is less than the second radius at an ejection end of the curved ejection rail.

7. The inclining aircraft ejection seat assembly of claim 1, wherein the ejection seat further comprises multiple guides disposed on the side of the ejection seat.

8. The inclining aircraft ejection seat assembly of claim 7, wherein the multiple guides are configured to travel along the arcuate path.

9. The inclining aircraft ejection seat assembly of claim 7, wherein an intermediate guide of the multiple guides extends past a back surface of the ejection seat.

10. The inclining aircraft ejection seat assembly of claim 7, wherein a first guide is nearer a top surface of the side, a second guide is intermediate the first guide and a third guide, and a first distance between the first guide and the second guide exceeds a second distance between the second guide and the third guide.

11. An inclining aircraft ejection seat assembly, comprising:
    a catapult;
    an ejection rail having a curved section and a linear section; and
    an ejection seat having a guide disposed on a side of the ejection seat configured to travel along at least the linear section of the ejection rail and change a configuration of the ejection seat from a reclining position to an inclining position prior to ejection, wherein:
        a first ejection seat position including a first seat angle between a horizontal reference plane and a seat back plane for the reclining position is between approximately 10-45°,
        a second ejection seat position including a second seat angle between the horizontal reference plane and the seat back plane for the inclining position is greater than the first seat angle,
        the ejection rail is configured to reposition the ejection seat from the first ejection seat position to the second ejection seat position prior to ejection of the ejection seat where the guide becomes disengaged with the ejection rail, and
        the ejection seat is configured to follow a path defined by the ejection rail in response to an explosive force within the catapult.

12. The inclining aircraft ejection seat assembly of claim 11, wherein the guide comprises a roller.

13. The inclining aircraft ejection seat assembly of claim 11, wherein the reclining position comprises a zero-gravity position.

14. The inclining aircraft ejection seat assembly of claim 11, wherein the ejection seat further comprises multiple guides disposed on the side of the ejection seat.

15. A method of launching an ejection seat, comprising:
    reclining an aircraft ejection seat in a reclining position along an ejection rail, the aircraft ejection seat including a seat back defining a seat back plane, the ejection seat having a guide in mating engagement with and movable along the ejection rail;
    inclining the aircraft ejection seat into an inclining position, by movement of the guide along the ejection rail prior to launching the aircraft ejection seat; and
    ejecting the aircraft ejection seat along a path defined by the ejection rail in response to an explosive force within a catapult, the guide of the aircraft ejection seat disengaging the ejection rail by the ejecting; wherein:
    the ejection rail defines a longitudinal axis;
    the ejection rail is curved for an entirety of the longitudinal axis,
    a first ejection seat position including a first seat angle between a horizontal reference plane and the seat back plane for the reclining position is between approximately 10-45°,
    a second ejection seat position including a second seat angle between the horizontal reference plane and the seat back plane for the inclining position is greater than the first seat angle, and
    the ejection rail is configured to reposition the ejection seat from the first ejection seat position to the second ejection seat position prior to ejection of the ejection seat where the guide becomes disengaged with the ejection rail.

16. The inclining aircraft ejection seat assembly of claim 1, wherein the curved ejection rail has inwardly extending inner flanges disposed on opposing sides of an inner channel, the inner flanges disposed in a direction towards the side of the ejection seat.

17. The inclining aircraft ejection seat assembly of claim 1, further comprising a second curved ejection rail disposed on an opposite side of the ejection seat as the curved ejection rail.

18. The inclining aircraft ejection seat assembly of claim 1, wherein the curved ejection rail having a cross sectional shape that is one of C-shaped or I-shaped.

* * * * *